United States Patent
McCaffrey, Jr. et al.

[15] 3,648,828
[45] Mar. 14, 1972

[54] VIBRATORY CONVEYOR
[72] Inventors: 9920 W. Edgerton Ave. McCaffrey, Jr.; Horace McCaffrey, Jr., 9920 W. Edgerton Ave., Hales Corners, Wis. 53130
[22] Filed: Dec. 31, 1970
[21] Appl. No.: 103,073

[52] U.S. Cl. ..................................198/220 BA, 29/196.6
[51] Int. Cl. .........................................................B65g 27/00
[58] Field of Search ..............198/220 BA, 220 BB; 29/191, 29/195, 196.6; 181/.5; 252/62; 248/20, 21, 358; 161/182, 186, 161, 125

[56] References Cited

UNITED STATES PATENTS

| 3,199,664 | 8/1965 | Baker | 198/220 BA |
| 3,338,385 | 8/1967 | Sage | 198/220 BA |

*Primary Examiner*—Joseph Wegbreit
*Assistant Examiner*—Alfred N. Goodman
*Attorney*—Ronald E. Barry and James E. Nilles

[57] ABSTRACT

A trough for a vibratory conveyor having a base, a number of flexible mounts to support the trough on the base, and an eccentric drive assembly to impart controlled vibratory motion to the trough, the trough being formed as a three layer laminate which includes an inner or wear surface of steel, a core of lead, and a restraining layer of steel, the three layers being completely bonded or secured to each other to provide a sound attenuated structure.

10 Claims, 4 Drawing Figures

PATENTED MAR 14 1972 3,648,828

INVENTOR.
Horace Mc Caffrey, Jr.
BY
Ronald E. Barry 3,648,828

VIBRATORY CONVEYOR

BACKGROUND OF THE INVENTION

Vibratory conveyors of the type contemplated herein are used to transport materials by vibrating the trough at various travel speeds depending on the stroke and frequency of vibration. When handling castings, a throw and catch motion is used to move the casting along the conveyor and to shake out the casting as it is being conveyed. These conveyors can be of a considerable size resulting in unusually loud noise upon impact of the casting on the conveyor. It is generally recognized today that the air borne noises resulting from these conveyors cause serious impairment of the hearing of operators who have to be present in the conveyor area.

SUMMARY OF THE INVENTION

The trough of the present invention provides for a substantial reduction in noise level to a point where it will meet federal regulations. Sound insolation or insulation can be achieved by controlling one or more of the following characteristics of a structure: (1) Weight or mass, (2) limpness to vibration, (3) single or monolithic structure, and (4) imperviousness to the transfer of air. These characteristics can be achieved by forming the trough for a vibratory conveyor as a three layer laminate. The inner or supporting layer being formed of a high strength material such as steel, a core of a high density material such as lead, and a restraining layer of metal to protect the core. The three metal layers of the laminate being completely secured together to provide a substantially rigid structure.

Other objects and advantages will become apparent from the following description when read in connection with the accompanying drawings.

THE DRAWINGS

DESCRIPTION OF THE INVENTION

There are a number of damping methods used to damp structural vibrations and reduce air borne noise which emanate from a vibrating structure.

1. Isolation of the noise source—by mounting the vibrating structure on resilient springs or soft pads under or between the vibrating structure and the supporting housing;

2. Isolation of the noise source—by rigidly containing or restraining the vibrating structure by the use of reinforcements having a greater strength than the vibrating energy.

3. Lowering of the structure vibration by the mass law, i.e., the greater the mass the more energy is required to vibrate the structure.

4. Extensional damping by adhering a vibration absorbing layer to the surface of the vibrating object.

5. Shear vibration damping by adding one or more layers of restraining material to the vibrating structure.

Figure 1:
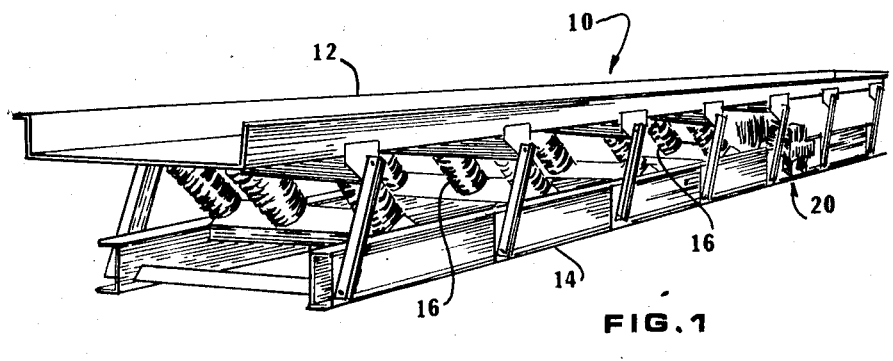
FIG. 1 is a perspective view of a conventional vibratory conveyor.
Figure 2:
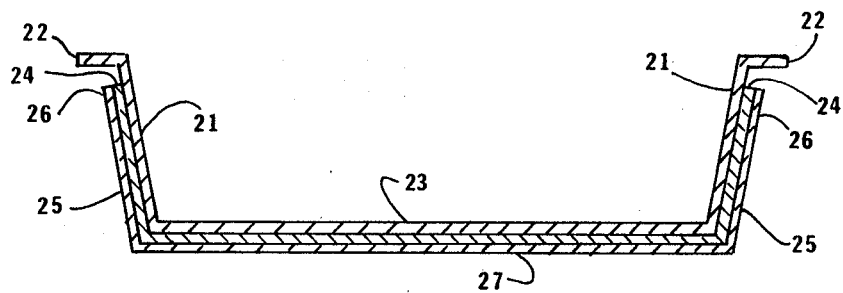
FIG. 2 is a cross section showing the three layer laminate for the trough of the conveyor.

In a vibratory type conveyor 10 as shown in FIG. 1, the basic mode of operation contemplates the vibration of the trough 12 as the force for conveying castings or other objects along the surface of the trough. The lift and catch action of the trough creates a noise each time the conveyed material strikes and slides along the trough, setting up a sustained sound volume in the area of the conveyor. The sound volume increases with an increase in the size of the trough due to the greater area of the vibrating surface.

The trough 12 of this invention has been formed so that it takes advantage of three of the above characteristics required for good sound insulation, i.e., extensional damping, mass damping and shear damping. In accomplishing this result, the trough 12 is formed as a three layer lamination having a core of lead to provide the major damping force. In this regard, lead has been found to be the best material for this type of structure because of its basic characteristics: Weight—710 pounds per cubic foot; Modulus of Elasticity—2,000,000 pounds per square inch; melting point—617° F.; boiling point—3,000° F.; and relatively inexpensive material. When lead is combined with steel having a Modulus of Elasticity of 30,000,000 pounds per square inch, in a three layer laminate, the extreme vibratory characteristic of steel is retarded or damped thereby resulting in a substantial reduction in noise.

Referring specifically to the drawings, the vibratory conveyor 10 is shown as having the trough 12 according to the present invention supported on a base 14 by means of a number of resilient supports 16. In this particular conveyor, rubber shear mounts are used to support the trough 12 and also serve as a spring reactor system in imparting the throw and catch motion to the trough 12 on the conveyor. Vibratory motion is imparted to the trough 12 by means of an eccentric drive assembly 20 as is generally understood.

The trough 12 is formed as a three layer laminate having a supporting surface or pan 22, a core of lead 24, and a restraining layer 26. The pan 22 is formed by bending a sheet of steel to define sides 21 and a bottom 23. The steel can be from ⅛ inch to 1¼ inch depending on the size of the conveyor. The lead core 24 can vary from 10 mil to ¼ inch and is applied to the outside surface of the pan 22 as a single sheet or layer. The restraining layer 26 is also formed of a sheet of steel of 10 mil to ¼ inch and formed by bending to define side walls 25 and a bottom 27 of the same shape as the pan 22.

Figure 3:
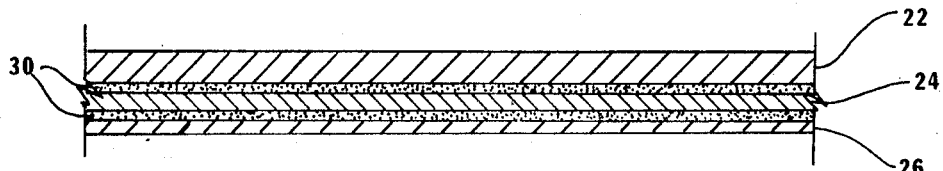
FIG. 3 is an enlarged view of a portion of the cross section of FIG. 2 showing the adhesive for low temperature operation.

If the trough is used in a low temperature system, the laminate layers can be bonded by means of a visco elastic adhesive 30 as shown in FIG. 3. Two adhesives have been effectively used for this purpose, Nexus and Cybond. Nexus P - 0003 has an operating temperature of 150° F. and can withstand operating temperatures of 250° to 300° F. for 1 hour without loss of adhesive properties. A newer development in the Nexus line has an operating temperature of 400° F. The adhesive Cybond 4010 has a service temperature range to 300° F. Nexus is a single material application, while Cybond is a mix of two ingredients. Both products combine outstanding peel strength with good shear strength. They will both resist shock, impact, and vibration. They both withstand hostile environments of water, oil, ozones, salt spray and X-radiation.

The lamination of a single sheet of lead to a single sheet of steel is effective for vibration damping. In this case, "mass," and extensional damping takes place. The area treated, thickness of steel and weight of lead are the principal parameters determining this effectiveness. However, lead does not have sufficient strength for shear damping. The addition of the steel restraining layer 26 to the lead core gives a more complex laminate and added vibration control. When this is done, all three damping systems act in concert.

Figure 4:
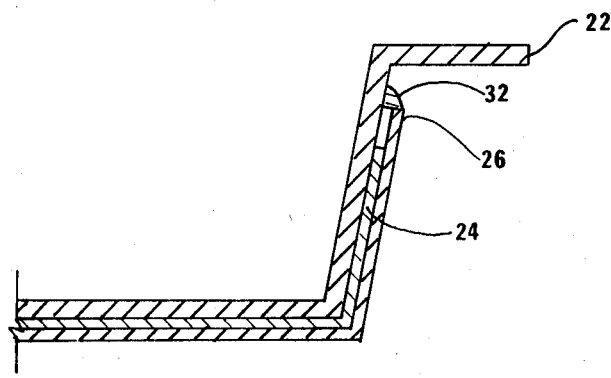
FIG. 4 is an enlarged section of a portion of an alternate form of the three layer laminate for the trough for high temperature operation.

It could reasonably be assumed that as a consequence of this combination the third layer or core layer undergoes shear distortion. This distortion causes friction and in addition to the adjoining visco elastic adhesive friction results in a greater damping of the total system. The restraining layer 26 adds to the vibration damping capability of the laminate by its high modulus of elasticity, thus increasing the friction. The results, a considerably greater rate of vibration decay.

Where higher operating temperatures are contemplated for the conveyor, that is, above 600° F., the visco elastic adhesive is omitted. The laminate is formed by means of a weld provided between the outer edge of the layer 26 and the outer surface of pan 22 to form a reservoir between the layers in which the lead sheeting has been previously placed. The laminate is then heated to above the melting point of the lead or lead alloy used. This causes the lead to flow and to intimately bond the lead core to the supporting and restraining layers as seen in FIG. 4. The lead core substantially fills the space between the layers leaving a small space for expansion. Upon cooling, the intimate wedding of the metals results in the desired vibration damping capability and when liquid imparts damping action.

In a conveyor which had a standard trough of a single layer of steel and a laminated conveyor trough of a ⅛ inch steel pan, a ⅛ inch lead sheeting and a ⅛ inch restraining layer, the following results were achieved:

|  | Untreated surface | | | Treated surface | | |
|---|---|---|---|---|---|---|
| Scale | A | B | C | A | B | C |
| Scraped casting across the surface, db | 76 | 77 | 77 | 62 | 65 | 66 |
| Decibel loss |  |  |  | −14 | −12 | −11 |
| Test one, db | 84 | 88 | 88 | 66 | 68 | 66 |
| Decibel loss |  |  |  | −18 | −20 | −22 |
| Test two, db | 88 | 92 | 93 | 74 | 76 | 76 |
| Decibel loss |  |  |  | −14 | −16 | −17 |

As indicated from the above tests, the air borne noises created by the sound pressure buildup of the vibratory trough was radically reduced. The untreated steel surface when struck sharply vibrated after the actual blow had been made, thus when repeated blows are made the continued vibration is compounded or results in a sound pressure buildup. A lead core laminate as described herein stops this continuing vibration, reducing the noise level to the indicated decibel ratings.

I claim:

1. A vibratory conveyor comprising,
a base,
a trough,
a number of flexible mounts supporting the trough on the base, said trough including a supporting layer, a restraining layer, and a lead core secured to said supporting layer and said restraining layer, and
means for vibrating said trough.

2. The conveyor according to claim 1 including a visco elastic adhesive between said lead core and said supporting and restraining layers.

3. The conveyor according to claim 1 wherein the outer edge of said restraining layer is welded to said supporting layer and said lead core substantially completely fills the space between said supporting and restraining layers.

4. The conveyor according to claim 2 wherein said supporting layer is formed from a sheet of steel.

5. The conveyor according to claim 4 wherein said restraining layer is formed of a sheet of steel and said core is formed of a sheet of lead, said restraining layer and said core having a thickness less than the supporting layer.

6. A trough for a vibratory conveyor having a base, a number of flexible mounts for supporting said trough and a vibratory assembly operatively connected to vibrate said trough on said base, said trough including a supporting member, a restraining member, and a core of lead secured to said members.

7. The trough according to claim 6 wherein the outer edge of said restraining member is welded to said supporting member.

8. The trough according to claim 7 wherein said supporting member and restraining member are formed of sheets of steel, the thickness of the supporting layer being greater than the thickness of the restraining layer.

9. The trough according to claim 6 including a visco elastic adhesive provided between said core and said members.

10. The trough according to claim 9 wherein said supporting and restraining members are both formed of a sheet of steel, the thickness of the supporting member being greater than the thickness of the restraining member.

* * * * *